United States Patent
Dawkins

(10) Patent No.: US 7,433,998 B2
(45) Date of Patent: Oct. 7, 2008

(54) SYSTEM AND METHOD FOR IMPLEMENTING SELF-DESCRIBING RAID CONFIGURATIONS

(75) Inventor: William P. Dawkins, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 269 days.

(21) Appl. No.: 11/036,679

(22) Filed: Jan. 14, 2005

(65) Prior Publication Data

US 2006/0161807 A1 Jul. 20, 2006

(51) Int. Cl.
*G06F 12/06* (2006.01)
*G06F 12/10* (2006.01)

(52) U.S. Cl. .................. 711/114; 711/202; 711/206

(58) Field of Classification Search ............ 711/114, 711/221, 202, 206; 717/136, 137
See application file for complete search history.

(56) References Cited

U.S. PATENT DOCUMENTS

| | | | | |
|---|---|---|---|---|
| 5,018,095 A | * | 5/1991 | Nissimov | 711/4 |
| 5,075,804 A | * | 12/1991 | Deyring | 360/49 |
| 5,321,826 A | * | 6/1994 | Ushiro | 711/162 |
| 5,822,782 A | * | 10/1998 | Humlicek et al. | 711/170 |
| 6,098,119 A | * | 8/2000 | Surugucchi et al. | 710/10 |
| 6,128,730 A | * | 10/2000 | Levine | 713/1 |
| 6,681,386 B1 | * | 1/2004 | Amin et al. | 717/136 |
| 6,745,324 B1 | * | 6/2004 | Skazinski et al. | 713/2 |
| 7,073,017 B2 | * | 7/2006 | Yamamoto | 711/103 |
| 7,136,994 B2 | * | 11/2006 | Zimmer et al. | 713/2 |
| 2002/0035670 A1 | * | 3/2002 | Okabayashi et al. | 711/114 |
| 2002/0095548 A1 | * | 7/2002 | Mansur et al. | 711/114 |
| 2002/0166026 A1 | * | 11/2002 | Ulrich et al. | 711/114 |
| 2002/0194528 A1 | * | 12/2002 | Hart | 714/6 |

* cited by examiner

*Primary Examiner*—Hyung Sough
*Assistant Examiner*—Kenneth M Lo
(74) *Attorney, Agent, or Firm*—Baker Botts L.L.P.

(57) ABSTRACT

A system and method is disclosed for the implementation of self-describing configurations in storage array. Each storage drive of the storage array includes at a defined location in the storage drive a self-describing function. When the storage controller receives a request to access a data block in the storage array, the storage controller executes the self-describing function with reference to the requested data block. The result of the executed self-describing function is an identification of the physical location of the data block within the storage array.

14 Claims, 2 Drawing Sheets

SYSTEM AND METHOD FOR IMPLEMENTING SELF-DESCRIBING RAID CONFIGURATIONS

TECHNICAL FIELD

The present disclosure relates generally to the field of computer networks, and, more particularly, to a system and method for the implementation of a self-describing RAID configuration in a disk array.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include a storage system or storage network that includes fault tolerant data storage. One example of a fault tolerant data storage system is a RAID (Redundant Array of Independent Disks) storage system. RAID storage systems combine multiple disks into an array of disk drives to obtain performance, capacity, and reliability advantages over other storage techniques, including, for example, a single large drive. Although RAID storage systems are designed and sold by several manufacturers, data compatibility between RAID storage systems from different manufacturers is limited, if not completely nonexistent. As a result, if a RAID array is created on a set of disks and a RAID controller from a first manufacturer, it is not possible to move one or more of the disks to a RAID controller from a second manufacturer and access data on the moved disks through the RAID controller of the second manufacturer. The issue of data incompatibility between RAID storage systems of different manufacturers will become more problematic as disk backup systems become more prevalent. Some RAID disk backup systems require that individual disks be swapped into and out of the drive array. If a backup is required, and the controller that wrote the data is not available, the data on the backup disk will likely not be accessible.

SUMMARY

In accordance with the present disclosure, a system and method is disclosed for the implementation of self-describing configurations in a storage array. Each storage drive of the storage array includes at a defined location in the storage drive a self-describing function. When the storage controller receives a request to access a data block in the storage array, the storage controller executes the self-describing function with reference to the requested data block. The result of the executed self-describing function is an identification of the physical location of the data block within the storage array.

The system and method disclosed herein is technically advantageous because it provides a system and method through which the location of data blocks can be identified without the necessity of storing a mapping function at or near the storage controller. Instead, the mapping function for the storage array is maintained in each of the drives of the storage array. The mapping or self-describing function is retrieved, decoded if necessary to place the function in a programming language executable by the storage controller, and then executed to identify the location of the physical data block that is the subject of the logical access request.

Another technical advantage of the system and method disclosed herein is that he disclosed system and method promotes the compatibility of storage networks that include storage drives and storage controllers provided or manufactured by different manufacturers. Because each storage drive includes a self-describing function that identifies the mapping of logical data blocks to physical data blocks, the storage controllers and the individual drives of the storage network may be swapped in and out of the network without regard to the manufacturer of the storage controller or storage drive. The interchangeability of the storage controller and storage drives of the storage network promotes the use of efficient disk-based backup schemes and eases customer confusion concerning the interchangeability of proprietary schemes for storage controllers and storage drives. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 is a flow diagram of a series of method steps for retrieving and executing a self-describing function in a storage array.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
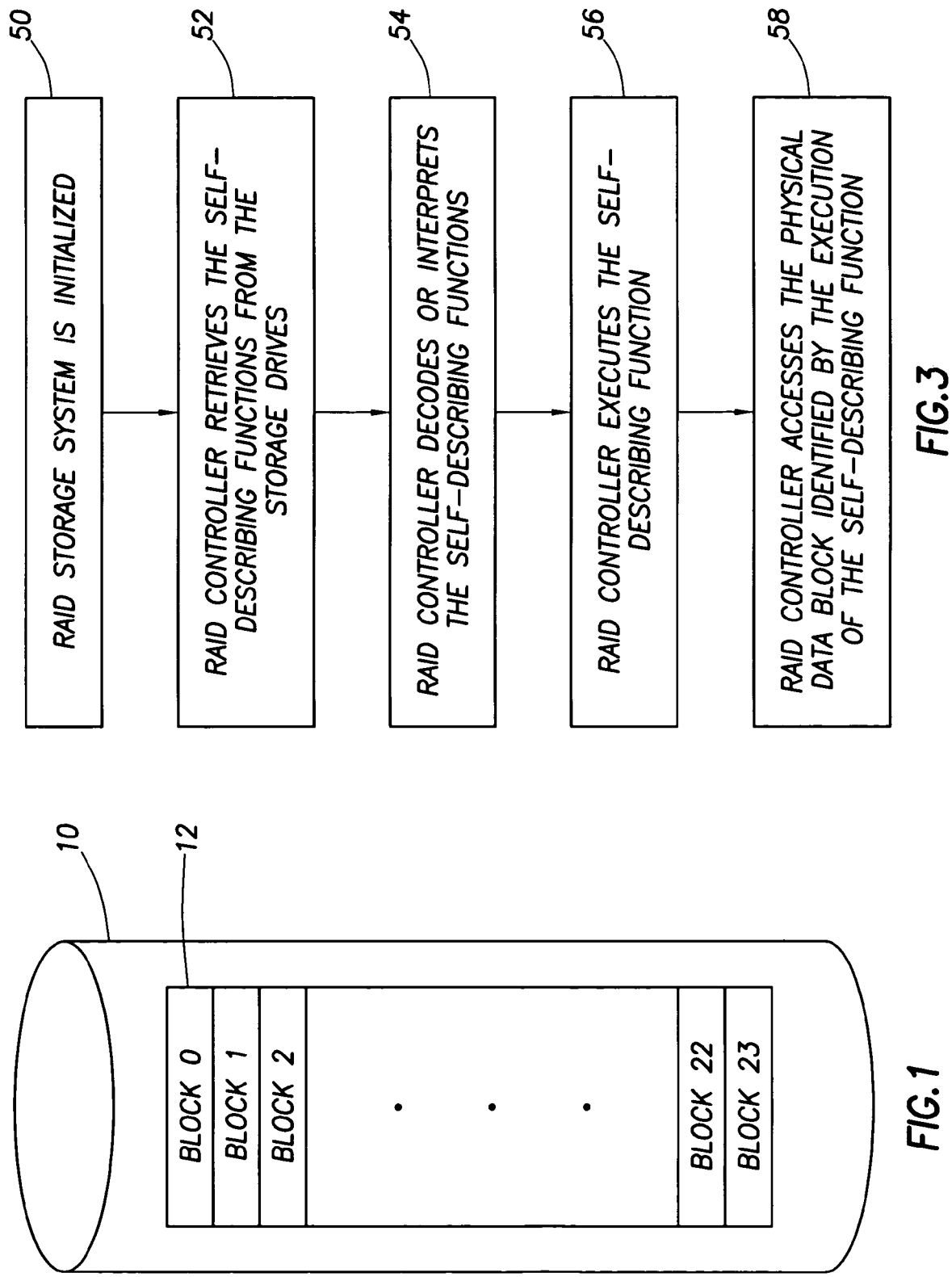
FIG. 1 is a diagram of a logical view of the data blocks of a storage system.

Shown in FIG. 1 is a diagram of a logical view of the data blocks of a RAID storage system as seen from the perspective of a user of the RAID storage system. From the perspective of a user of a RAID storage system, data is written to a single logical volume, which is shown at FIG. 1 at 10. For the purposes of this example, only one logical volume is shown as being mapped to the RAID storage system. In the example of FIG. 1, the logical volume includes twenty-four individual data blocks 12, which are labeled as Block 0 through Block 23. The RAID storage system maps the blocks of the logical volume to physical disks in an array of physical disks. Data is stored to the physical disks according to one of several possible RAID storage formats.

Figure 2:
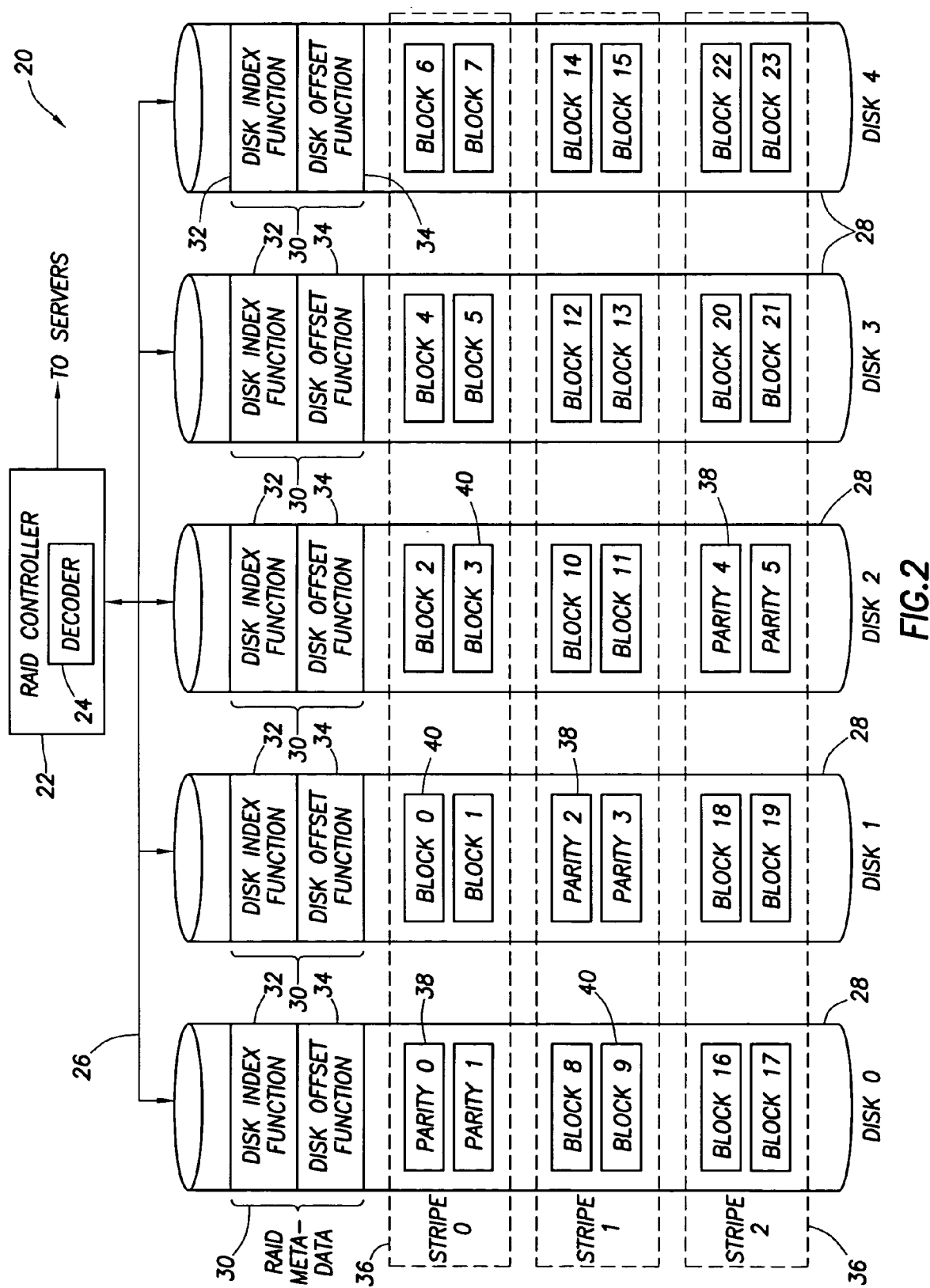
FIG. 2 is a diagram of a storage network.

Shown in FIG. 2 is a diagram of a storage network 20. Storage network 20 includes a RAID controller 22 and a RAID array of five disks 28. The RAID array of FIG. 2 is a RAID Level 5 array, which is sometimes referred to as a rotating parity RAID array. In a RAID Level 5 storage array, data is striped across the disks of the array. For each stripe, the set of parity bits generated by an exclusive-OR of the strips of each stripe are stored on a disk that is separate from the data blocks of the stripe. The parity bits for the respective stripes of data are distributed among the disks of the storage system so that each disk will likely contain both data blocks for the data in the stripe and parity bits related to some other set of data in another stripe. In a RAID Level 5 RAID array, it is typical that no single disk includes all of the parity data. In the case of a Level 5 RAID array, if one of the disks fails, the data on the disk can be rebuilt by performing an exclusive-OR operation with the data on the other disks in the data stripe, including the parity bits associated with the data stripe.

The Level 5 RAID array of FIG. 2 includes five disks 28. Each disk 28 is associated with an index number. In the example of FIG. 2, the disks 28 have index numbers 0 through 4. Three data stripes 36 are written across the five disks. Each data stripe 36 is two data blocks 40 wide, and each data stripe includes a parity strip that is comprised of two parity blocks 38. In Stripe 0, for example, parity blocks Parity 0 and Parity 1 reside on Disk 0. Striped across Disk 1 through Disk 4 is Stripe 0, which includes Block 0 through Block 7. In this example, the bits in the block Parity 0 are derived from an exclusive-OR operation on the data bits of Block 0, Block 2, Block 4, and Block 6; and the bits in the block Parity 1 are derived from an exclusive-OR operation on the data bits of Block 1, Block 3, Block 5, and Block 7. As another example, in Stripe 2, the parity blocks are saved to Disk 2, and Block 16 through Block 23 of Stripe 2 are saved to Disk 0, Disk 1, Disk 3, and Disk 4. In the case of Stripe 2, the bits in the block Parity 4 are derived from an exclusive-OR operation on the data bits of Block 16, Block 18, Block 20, and Block 22; and the bits in the block Parity 5 are derived from an exclusive-OR operation on the data bits of Block 17, Block 19, Block 21, and Block 23. Comparing FIG. 1 to FIG. 2, the twenty-four data blocks of the logical drive of FIG. 1 have been mapped in FIG. 2 across five physical disks in the RAID array.

Following a request for access to a data block within the logical volume, RAID controller 22 is able to determine the precise location of each data block within the disks of the RAID array by calling two data mapping functions, which are stored in each of the disks of the RAID array. Each disk array includes a defined area of metadata storage 30. Within the metadata storage area of each disk are two self-describing data mapping functions for each logical volume that is mapped to the RAID array: a disk index function 32 and a disk offset function 34. Each of the disk index function 32 and the disk offset function 34 are preferably written in a scriptable or interpretable programming language, such as JAVASCRIPT. JAVASCRIPT is a registered trademark of Sun Microsystems, Inc., Santa Clara, Calif. With reference to the flow diagram of FIG. 3, upon initialization of the RAID storage system (step 50), the RAID controller at step 52 retrieves each of the data mapping functions from each of the disks of the disk array. If necessary, the RAID controller at step 54 decodes or interprets the mapping functions to transform the self-describing mapping functions into a scripted programming language that is executable by the operating system of the RAID controller. The decoding or interpreting step is performed by a decoder function 24 (FIG. 2) within controller 22. Following any necessary decoding or interpreting of the self-describing mapping functions, each of the data mapping functions is executed by the operating system of the controller at step 56. The execution of the self-describing functions results in the identification of the physical location of the requested data block on the disks of the RAID array, thereby enabling access to the physical data block at step 58.

The disk index function 32 returns the index number of the disk in the RAID array that includes the data block that is the subject of the access request. The input to the disk index function is an integer that represents the index number of the data block that is the subject of the access request. In the form of pseudo-code, the disk index function may take the form of:

```
int Extent_Index_Mapping_Func (int Requested_Data_Block_Index)
/* Given the index number of the requested data block as an input, the
   function scans a the map of the logical data blocks to the physical data
   blocks and returns the index number of the physical disk that includes
   the requested data block */
```

The disk offset function 34 returns an integer that is a count of the number of data blocks from the beginning of the disk to the requested data block. With reference to the example of FIG. 2, if the disk offset function 34 were to return the integer 0, the requested data block would be the first data block in the disk. If the disk offset function were to return the integer 3, the requested data block would be the fourth data block in the disk. The input to the disk offset function is an integer that represents the index number of the data block that is the subject of the access request. In the form of pseudo-code, the disk offset function may take the form of:

```
int Disk_Offset_Mapping_Func (int Requested_Data_Block_Index)
/* Given the index number of the requested data block as an input, the
   function scans a the map of the logical data blocks to the physical data
   blocks and returns an integer that is equal to the count of data blocks
   from the beginning of the disk to the requested data block */
```

As an example, assume that the user or a host operating system requests a read or write access to block 10. The block index integer 10 is provided to the disk index function 32, which returns an integer value 2. The integer value 2 is the index number of the disk of the RAID array that includes the data block 10. The block index integer 10 is next provided to disk offset function 34, which returns the value 2, which is a count of the of data blocks from the beginning of the physical disk to data block 10. Within physical disk 2, a pointer will have to advance two data blocks from the beginning of the disk to reach the requested data block. In this example, the pointer is initially set to point to Block 2 in Disk 2. After the pointer is advanced two data blocks, the pointer is positioned at Block 10 of Disk 2.

The storage methodology disclosed herein promotes compatibility between RAID systems provided or manufactured by different manufacturers. Through the use of the self-describing methodology disclosed herein, a RAID controller may identify the physical location of a data block even if the RAID controller and disk array were not provided or manufactured by the same manufacturer. The RAID controller need only be able to locate and decode, if necessary, the self-describing functions. Once the self-describing functions are retrieved by the RAID controller, the RAID controller is able to identify the location of each data block in the physical disks of the RAID array. In operation, the metadata and the self-describing functions that are included within the metadata will be stored in the same location in each physical disk. In this manner, because the self-describing functions are in the same storage location on each disk, any RAID controller, regardless of manufacturer, can locate and use the self-describing functions. The implementation of self-describing function in a predetermined location in each physical disk results in each disk being encoded with an algorithm that enables the RAID controller to locate and access the data blocks included on the disk.

Self-describing functions can also be included in the disks of the RAID array for the purpose of identifying parity information for the RAID array. A self-describing function could define the method used to calculate parity for each stripe or other redundancy information that would allow the user to rebuild the data of the array in the event of a failure in one of the physical disks of the array. The self-describing RAID implementation described herein has been described with reference to a single logical volume that is mapped to a RAID array. It should be recognized that multiple logical volumes may be mapped to a RAID array and each logical volume may be associated with a separate set of self-describing functions.

The self-describing RAID implementation described herein has been described with reference to two distinct self-describing functions, it should be recognized that the two self-describing functions could be incorporated into a single self-describing function that returns as an output the index for the disk and the offset of the disk that includes the requested data block. Although the self-describing RAID methodology disclosed herein has been described with respect to a Level 5 RAID array, it should be recognized that the invention disclosed herein is equally effective with respect to other RAID storage formats. It should also be recognized that the self-describing storage methodology disclosed herein may be employed in managed storage arrays other than RAID arrays. Although the present disclosure has been described in detail, it should be understood that various changes, substitutions, and alterations can be made hereto without departing from the spirit and the scope of the invention as defined by the appended claims.

What is claimed is:

1. A storage array, comprising:
   multiple storage drives;
   one or more logical volumes stored within the storage drives, wherein each storage drive comprises,
      metadata;
      a plurality of data blocks stored therein, wherein the data blocks of the multiple storage drives are saved to the multiple storage drives according to a redundant array of independent disks (RAID) storage methodology;
   for each of the one or more logical volumes, a self-describing function associated with the logical volume included within the metadata of each storage drive, wherein each of the one or more self-describing functions of each storage drive is operable to receive as an input an identifier of a data block and return as an output an identifier concerning the physical location of the data block, and wherein the identification of the physical location of the data block does not require reference to mapping information stored at a storage controller;
   wherein each self-describing function of each of the multiple storage drives comprises:
      an index function that returns as an output an index number associated with an identified one of the storage drives of the storage array; and
      an offset function that returns as an output an offset number that identifies the location of a data block within the identified one of the storage drives of the storage array; and
   wherein the self-describing function associated with one of the one or more logical volumes in each storage drive of the storage array is identical and is implemented in a scriptable programming language.

2. The storage array of claim 1, wherein the data blocks of the multiple storage drives are saved to the multiple storage drives according to a fault tolerant data storage methodology.

3. The storage array of claim 1, wherein each self-describing function is implemented in a scriptable programming language.

4. The storage array of claim 1, wherein an identical self-describing function associated with one of the one or more logical volumes is included in each storage drive of the storage array.

5. A storage network, comprising:
   a storage controller;
   a storage drive array coupled to the storage controller, the storage drive array comprising multiple storage drives;
   one or more logical volumes stored within the multiple storage drives, wherein each storage drive in the storage drive array comprises,
      metadata;
      a plurality of data blocks stored therein, wherein the data blocks of the multiple storage drives are saved to the multiple storage drives according to a redundant array of independent disks (RAID) storage methodology;
   for each of the one or more logical volumes, a self-describing function associated with the logical volume included within the metadata of each storage drive, wherein each of the one or more self-describing functions of each storage drive is operable to receive as an input an identifier of a data block and return as an output an identifier concerning the physical location of the data block, and wherein the identification of the physical location of the data block does not require reference to mapping information stored at the storage controller,
   wherein each self-describing function of each of the multiple storage drives comprises:
      an index function that returns as an output an index number associated with an identified one of the storage drives of the storage array; and an offset function that returns as an output an offset number that identifies the location of a data block within the identified one of the storage drives of the storage array;

wherein the self-describing function associated with one of the one or more logical volumes in each storage drive of the storage array is identical and is implemented in a scriptable programming language; and wherein the storage controller comprises a decoder function operable to decode each self-describing function from a first programming language to a second programming language.

6. The storage network of claim 5, wherein the data blocks of the multiple storage drives are saved to the multiple storage drives according to a fault tolerant data storage methodology.

7. The storage network of claim 5, wherein the data blocks of the storage array are saved to the multiple storage drives according to a redundant array of independent disks (RAID) storage methodology.

8. The storage network of claim 7, wherein each self-describing function of each storage drive comprises a function that identifies the format of parity data on the storage array.

9. The storage network of claim 5, wherein each self-describing function of each storage drive is implemented in a scriptable programming language.

10. A method for identifying the location of a data block in a storage array comprising multiple storage drives, wherein one or more logical volumes are stored within the multiple storage drives, wherein each storage drive in the storage array comprises metadata and a plurality of data blocks stored therein, wherein the data blocks of the multiple storage drives are saved to the multiple storage drives according to a redundant array of independent disks (RAID) storage methodology, comprising:

receiving at a storage controller an access request for a memory location within a data block residing in one of the storage drives of the storage array;

retrieving a self-describing function associated with one of the one or more logical volumes from a storage drive of the drive array; and executing the self-describing function with reference to the requested data block of the access request received at the storage controller, wherein the self-describing function provides as a result the location of the data block within the storage drives of the storage array, wherein the self-describing function is capable of identifying the location of the data block without reference to mapping data stored at the storage controller, and wherein each self-describing function associated with one of the one or more logical volumes comprises:

an index function that returns as an output an index number associated with an identified one of the storage drives of the storage array; and an offset function that returns as an output an offset number that identifies the location of a data block within the identified one of the storage drives of the storage array;

wherein the self-describing function associated with one of the one or more logical volumes in each storage drive of the storage array is identical and is implemented in a scriptable programming language; and wherein the storage controller comprises a decoder function operable to decode each self-describing function from a first programming language to a second programming language.

11. The method for identifying the location of a data block in a storage array of claim 10, wherein the step of executing the self-describing function comprises:

executing the index function, wherein the index function provides as a result an identifier for the storage drive of the storage array that includes the data block; and executing the offset function, wherein the offset function provides as a result an identifier of the location of the data block within the storage drive of the storage array.

12. The method for identifying the location of a data block in a storage array of claim 10, wherein the self-describing function is implemented in a script programming language that can be run by a software program of the storage controller.

13. The method for identifying the location of a data block in a storage array of claim 10, further comprising the step of decoding the self-describing function to convert the self-describing function from a first programming language to a second programming language.

14. The method for identifying the location of a data block in a storage array of claim 13, wherein the step of executing the self-describing function comprises:

executing the index function, wherein the index function provides as a result an identifier for the storage drive of the storage array that includes the data block; and executing the offset function, wherein the offset function provides as a result an identifier of the location of the data block within the storage drive of the storage array.

* * * * *